United States Patent [19]

Kaplan

[11] Patent Number: 5,414,489
[45] Date of Patent: May 9, 1995

[54] LIGHT PIPE SPECTRAL FILTER

[75] Inventor: Martin C. Kaplan, Rochester, N.Y.

[73] Assignee: Eastman Kodak Company, Rochester, N.Y.

[21] Appl. No.: 263,639

[22] Filed: Jun. 22, 1994

[51] Int. Cl.⁶ .................................................. G01J 1/00
[52] U.S. Cl. .......................................... 355/67; 355/1; 355/71; 355/229; 355/238
[58] Field of Search .................. 355/1, 67, 71, 229, 355/233, 238

[56]  References Cited

U.S. PATENT DOCUMENTS

| | | | |
|---|---|---|---|
| 4,321,030 | 3/1982 | Kramer | 358/294 |
| 4,868,383 | 9/1989 | Kurtz et al. | 250/228 |
| 5,079,678 | 1/1992 | Parker | 362/84 |
| 5,103,385 | 4/1992 | Federico et al. | 362/298 |
| 5,155,596 | 10/1992 | Kurtz et al. | 358/214 |
| 5,215,370 | 6/1993 | Kaplan | 362/296 |
| 5,241,459 | 8/1993 | Kaplan et al. | 362/298 |

*Primary Examiner*—M. L. Gillner
*Assistant Examiner*—Daniel P. Malley

[57]  ABSTRACT

An elongated light source of the type employed in a document scanner for forming a line of uniform intensity, diffuse illumination at a document scanning plane. The light source has a longitudinally extending aperture for generating a line of light aligned with the light entrance end face of a generally planar, light conducting pipe. The light conducting pipe conducts light through its length and emits the light at a light exiting end face in proximity to a document scanning plane. The emitted light is spectrally filtered within the light pipe by the selected colored material thereof for absorbing unwanted wavelengths and/or by shaping the light pipe and/or by use of dichroic filter coatings for reflecting unwanted light wavelengths. The light pipe may be configured with a slanted light exiting end face or in two sections each with a mating slanted end face, having dichroic filter coatings on one or both slanted end faces, fitted together end-to-end to form the light conducting pipe and to selectively effect filtering of the scan line of light. The spectral filtering allows the configuration of the elongated light source as a light integrator with a lamp positioned within the light integrating cavity for maximizing efficiency while achieving color balance.

21 Claims, 4 Drawing Sheets

LIGHT PIPE SPECTRAL FILTER

CROSS REFERENCE TO RELATED APPLICATIONS

Reference is made to commonly assigned U.S. patent application Ser. No. 197,775 filed on Feb. 16, 1994, and entitled LIGHT INTEGRATING CAVITY FOR A FILM SCANNER.

FIELD OF THE INVENTION

The present invention pertains to spectral filtration of fluorescent lamps, integrating cavities, and other diffuse illuminators for use in transmission and reflection scanners, particularly the spectral filtration of a light bar or pipe employed therewith.

BACKGROUND OF THE INVENTION

Conversion of analog images into digital data has become widespread for a variety of applications, including storing, manipulating, transmitting and displaying or printing copies of the images. For example, images captured in photographic media are converted to digital data and stored on compact discs for readout and display as a video image, as exemplified by the KODAK ® Photo-CD system, or reproduced employing various types of color printers. In order to convert the photographic image into a set of digital line data, the film image frame is transported through a film scanning station and illuminated in each scan line with a light beam. Attempts are made to make the linear light beam of uniform intensity along its length and provide diffuse illumination. The linear light beam is typically produced by an elongated light source or by a light integrating cavity of a light integrator that receives light from a discrete lamp outside the light integrator and forms it into the linear light beam.

With respect to light integrators per se, various configurations are known in the art of still and telecine film scanners and typically include an elongated cylindrical integrating cavity having a light beam input port, diffusely reflective walls and an output slit which extends parallel to the longitudinal axis of the cylindrical integrating cavity. Improved light integrators for such uses are disclosed in commonly assigned U.S. Pat. Nos. 4,868,383, 5,103,385, 5,155,596, 5,215,370 and 5,241,459. Typically, a light source for generating an intense beam of light and an optical system for directing the beam through the input port into the cavity are provided. The introduced light is diffusely reflected in the cavity and is emitted from the elongated slit as a uniform intensity, diffuse line of light. Various design considerations are taken into account to optimize the angular intensity profile and decrease flare in the emitted scan line of light as described, for example, in the above-referenced '370 patent. Such light integrators are intended to produce a line of diffuse, Lambertian light which has a uniform linear and angular distribution, and excellent line scan results can be obtained over a wide range of operating conditions.

Aperture fluorescent lamps are also used as efficient light sources in document scanners, film scanners, and other transmission and reflection scanners. Non-aperture, elongated fluorescent lamps are similarly used, particularly in reflective scanning of documents to expose an image of the document on the charged photoconductor in plain paper copiers. Non-aperture fluorescent lamps are generally less bright than the scan line of light provided by the aperture fluorescent lamp or the light integrator described earlier.

Fluorescent lamps (and other elongated lamps) do have the advantage of high efficiency defined as optical power leaving the lamp divided by electrical power to the lamp. Efficiency of an integrating cavity can be increased by placing the light source or lamp inside the integrating cavity, because in that position the cavity collects and integrates light emitted at all angles from the lamp. In light integrators having the lamp outside the cavity, spectral filtration may be done between the lamp and the cavity input port. However, when the lamp is inside the cavity, filtration is more difficult. Placing a filter inside the cavity is generally inadequate, because multiple bounces of light within the cavity cause different light paths to cross the filter different numbers of times (adversely affecting controlled filtration). Placing the filter outside the cavity solves the multiple path problem, but requires separation between the cavity and the document, causing a decrease in brightness.

Regardless of the source of illumination, the light transmitted through the illuminated scan line of the image frame typically is focused by a lens system on a linear CCD array image detector which produces three primary color light intensity signals, for each image pixel, that are digitized and stored. The digitized signal values for the pixels of each scan line may be formatted to a standard for video recording and display and stored on compact disc or magnetic media. Such film scanners take a variety of forms, and the various common aspects of film image frame digitizing, particularly line illumination and linear CCD array-based digitizers, are described in greater detail in the above-referenced '596 patent.

Figure 1:
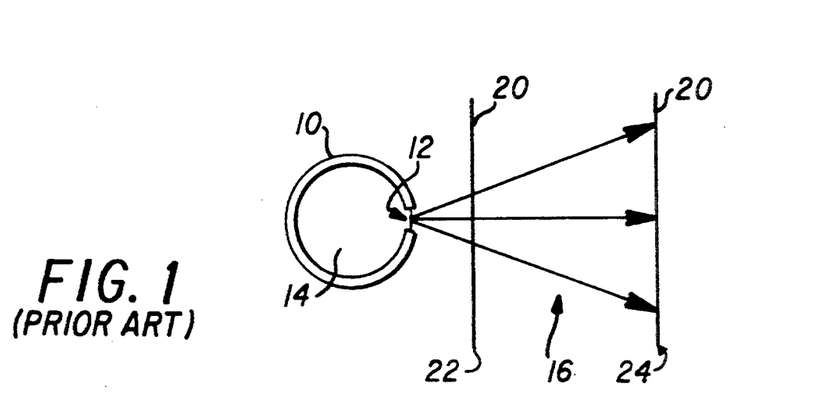
FIG. 1 is a schematic illustration demonstrating the reduction in brightness of illumination with distance of a document being scanned.

Light emitted by both fluorescent lamps and light integrators is Lambertian, i.e. diffusely spread over all angles, commonly to decrease imaging of surface defects of the document being scanned. Consequently, the farther the document (or film, or other object) is from the lamp or scan line of light, the less brightly it is illuminated, as illustrated schematically in FIG. 1. In FIG. 1, an elongated aperture fluorescent tube 10 radiates the elongated line of light in a diverging pattern 16 from the aperture 12. The divergence of the pattern 16 of the scan line diminishes light intensity on the document 20 with distance from the aperture 12. The intensity is greater when document 20 is in the close position 22 than when it is farther away in the distant position 24. Consequently, it is desirable to define a document or scanner path of travel with the aperture 12 closely adjacent the document. The above-referenced '385 and '370 patents show side wall extensions leading to the light exiting aperture that allow the close position 22 for the document scanning plane to be more distant from the axis of a light integrator.

In almost all cases involving copying or digitizing color images, it is also necessary to filter the wavelengths of the light emitted in the scan line impinging on or through the document to compensate for spectral imbalances in the light source, the light detectors and/or the transmissivity or reflectivity of the document and its color balance characteristics. For example, negative color film base is typically orange, requiring a bluish light source that is achieved by partly absorbing red and green light. Typical fluorescent lights are not sufficiently blue and require filtration. Moreover, fluorescent lamps typically emit considerable infra-red light which must be removed by filtration to avoid excessive heating of the film, and because the CCD element signal is degraded by infra-red light.

In the light integrator context, the light beam input into the integrating cavity is also typically spectrally filtered for the reasons described in the above-referenced '596 and '383 patents. Again, the xenon and tungsten halogen lamps typically used generate considerable infra-red light that can cause excessive heating of documents, e.g. photographic film, and the infra-red light may pass through the film and be detected by the CCD elements, which respond by generating spurious signals. It is necessary to block or absorb all the infra-red light and to absorb certain wavelengths of the visible light to compensate for light absorbancy characteristics of the document, e.g. the orange negative film base color.

Figure 2:
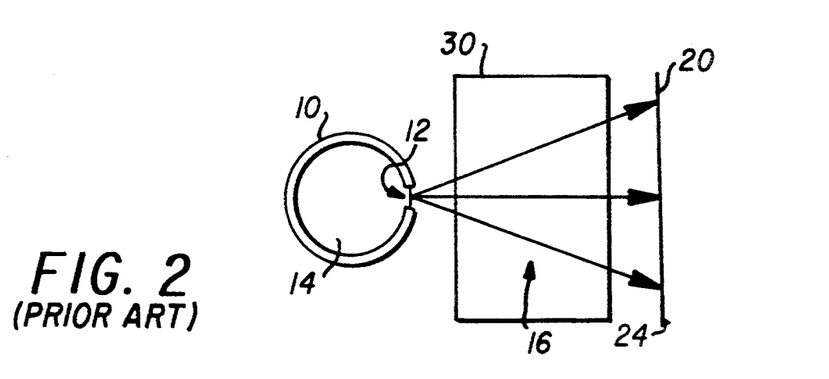
FIG. 2 is a schematic illustration demonstrating the reduction in brightness resulting from the insertion of a filter between the light source and the document, increasing the distance therebetween.

Filters may have other purposes. For example, notch filtering to remove a limited range of visible wavelengths may be required to attenuate wavelengths where red, green and blue color detectors overlap in sensitivity. The red, green and blue sensitivity of film or other color document scanners must be matched to the sensitivity or reproduction characteristics of printers or displays.

Where it is necessary to use filters between the aperture or slit and the scanned document, the filters can be relatively bulky. As shown in FIG. 2, installing a filter 30 between the light emitting slit or aperture 12 and the document 20 requires the document to be positioned in the distant position 24. This positioning causes the light from the aperture 12 to diverge, reducing the brightness at the document.

Problems to be Solved by the Invention

As shown in FIGS. 1 and 2, aperture and non-aperture lamps and light integrator light exit slits need to be physically close to the document (film, plain paper, photographic prints, etc.) being scanned, to avoid a loss of brightness from spreading of the light. This need for proximity conflicts with the need to provide spectral filtration by insertion of a thick spectral filter between the lamp or light integrator and the document, because the filter separates the emitted scan line of light and the document. Where light inegrators are used, it is desirable to place the lamp inside the light integrating cavity, for improved efficiency, while spectrally filtering the light before it reaches the document.

SUMMARY OF THE INVENTION

Accordingly, it is an object of the present invention to spectrally filter the line of light emitted from the aperture of a lamp or light integrator aperture while preventing the divergence of the emitted light beam.

It is a further object of the invention to provide a light integrator or lamp with a spectral filter at the light output aperture that filters the scan line of light directed onto the document to be scanned.

These and other objects of the invention are realized in combining an elongated light source, e.g. an aperture fluorescent tube or a light integrator, with a spectrally selective light pipe or bar at the aperture to achieve spectral filtration without spreading of the light (and concomitant loss of brightness) in the scan line of light at a document scanning plane.

More particularly, the elongated light source comprises an elongated fluorescent tube or light integrator emitting light in a spectral intensity pattern, a light pipe into which the emitted light is directed, and spectral filter means formed in or on the light pipe that is spectrally selective to attenuate and thereby alter the spectral intensity pattern of the light.

In a preferred embodiment, the elongated light source of the type employed in a document scanner for forming a line of uniform intensity, diffuse illumination at a document scanning plane comprises an elongated light source having a longitudinally extending aperture therein for generating light at the aperture, a generally planar, light conducting pipe, having a light entrance end face, a predetermined thickness, width and length and a light exiting end face, for conducting light entering the light entrance end face through its length and emitting the light from the light exiting end face, spectral filter means associated with the light conducting pipe for spectral filtering light emitted from the light exiting end face, and means for orienting the light conducting pipe with the light entrance end face positioned to receive light generated at the aperture and with the light exiting end face in proximity with a document scanning plane for conducting light exiting through the aperture along its length and for emitting the conducted light from the light exiting end face as a line of spectrally filtered diffuse illumination on a document in the document scanning plane.

In particular, the light source possesses spectral intensities that distort the scanning of documents and the spectral filtering means preferably comprises the selective colored material of the light conducting pipe for absorbing unwanted wavelengths and/or dichroic filter coatings for reflecting unwanted wavelengths from exiting through the light exiting end face. The light pipe may be configured with a slanted light exiting end face or in two sections each with a mating slanted end face, having dichroic filter coatings on one or both slanted end faces, fitted together end-to-end to form the light conducting pipe and to selectively effect filtering of the scan line of light.

In a light integrator embodiment, the light source may be fitted within the light integrating cavity.

Advantageous Effects of the Invention

This invention further improves brightness by using the light pipe to reduce the light spreading relative to an aperture fluorescent lamp with bulk filters alone. Moreover, it allows the line of light to be presented at the document scanning plane at a distance from the elongated lamp.

The spectrally selective light pipe may also be used in conjunction with other linear light sources as well, particularly in allowing the light source to be placed within a light integrating cavity of a light integrator to achieve enhanced efficiency. In light integrators with external lamps, the input filters may be replaced by the filtration of the light pipe. The lower intensity light at the exit slit conducted by the light pipe is less damaging to the spectral filter material, due to the lower intensity. The resulting light source in either case is simpler, less expensive and more compact The apparatus of the present invention embodied in the preferred embodiment provides a simple, compact light integrator that is sealed from dust.

BRIEF DESCRIPTION OF THE DRAWINGS

Other objects, advantages and features of the present invention will become apparent from the following specification when taken in conjunction with the accompanying drawings in which like elements are commonly enumerated and in which.

The figures are not necessarily to scale.

DETAILED DESCRIPTION OF THE PREFERRED EMBODIMENTS

Figure 3:
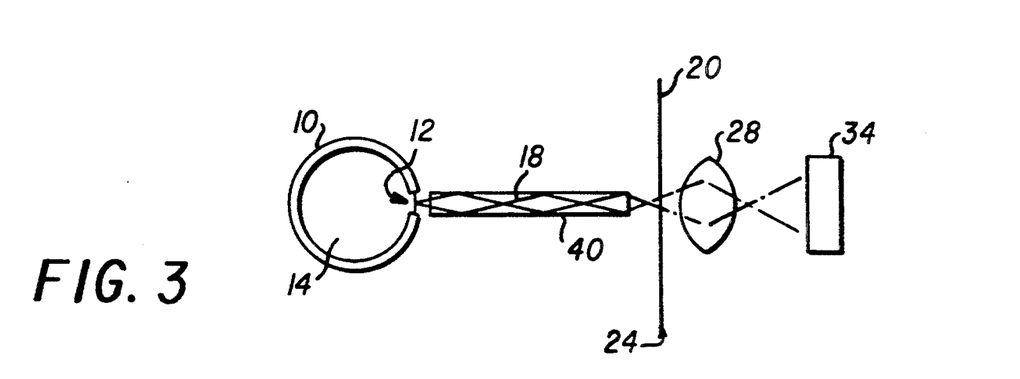
FIG. 3 is a schematic illustration of the concentration of the scan line of light in a light bar or pipe configured of a spectral filtration material, preventing reduction in brightness with distance.
Figure 4:
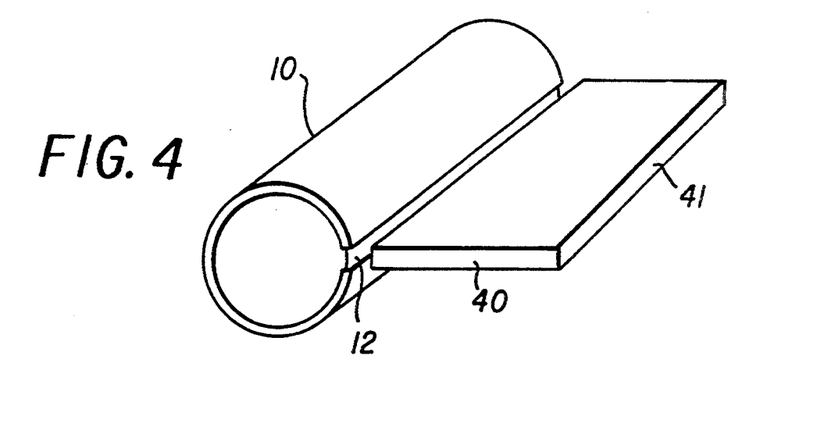
FIG. 4 is a perspective view of an aperture fluorescent lamp combined with a spectral filtering light pipe in accordance with the invention.

Turning now to FIGS. 3 and 4, they schematically and generally depict the principles and applications of the present invention in a scanner (that includes either a fluorescent lamp or a light integrator) providing an elongated scan line of light. Using a light conducting bar or pipe 40 for filtering the spectral output of the scan line confines the scan line of light, thereby reducing divergence of the light as shown in the confined pattern 18 in FIG. 3. The high level of brightness in the scan line emitted at aperture 12 is restrained in light pipe 40 to fall on document 20 in distant position 24 in a scan line of light.

The depicted document 20 in FIG. 3 is a transparency, e.g. a photographic filmstrip or slide. The scan line of light illuminates a linear region of the document 20 that is imaged by a lens 28 onto a photosensitive detector 34, e.g. linear arrays of color filtered CCD elements of the type described in the above-referenced patents, in a light transmission configuration. The distant position 24 thus represents a document scanning plane in this embodiment.

The light bar or pipe 40 consists of a rectangular slab of dielectric material (e.g. glass or plastic) with an index of refraction exceeding $\sqrt{2}$, having one end aligned with aperture 12 and the light exiting or free end face 41 located adjacent to the document 20. FIG. 4 is a schematic, perspective view of this arrangement.

By using colored material for the light pipe 40, spectral filtration of the light is accomplished. The cross-section width and thickness of the light pipe 40 matches the cross-section of the light source, i.e. the aperture 12 in this case, as shown in FIG. 3. The length of the light pipe 40 is selected to provide a convenient separation between the aperture and the document 20.

Figures 5, 6:
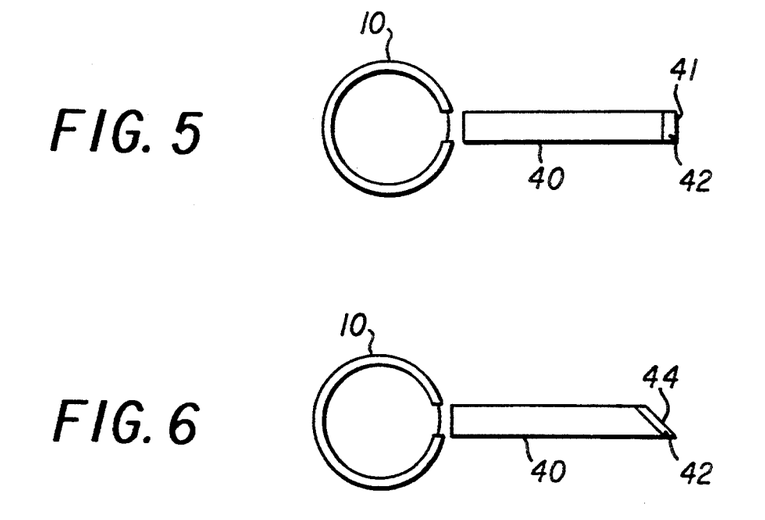
FIG. 5 is a schematic illustration of light pipe spectral filtration by a combination of colored material and dichroic filter coating.
FIG. 6 is a schematic illustration of light pipe spectral filtration by a combination of a colored material, light pipe and dichroic filter coating, with the coating at a slanted end face of the light pipe.

Spectral selectivity of the light pipe 40 may be achieved by using selected color material (e.g. colored glass or plastic) and/or by using dichroic filter coatings. Colored light conductive material achieves spectral selectivity by absorbing unwanted wavelengths, including wavelengths not visible to the eye. Dichroic filter coatings achieve spectral selectivity by reflecting unwanted wavelengths. In some applications, adequate spectral selectivity may be achieved by a combination of colored material and a dichroic filter coating 42 at the free end face 41 of the filter light pipe 40 as shown at coating 42 in FIG. 5, and/or at the other end aligned with the aperture 12. The spectral filtration achieved by the dichroic filter coating 42 is limited by the fact that some of the unwanted wavelength light it reflects will return to the interior of the tube 10, reflect within the tube, and once again enter the light pipe 40 and reach the dichroic filter coating 42. A fraction of the unwanted wavelength of light passes through the dichroic filter coating each time it strikes it. Thus, reflecting this light at the dichroic filter coating 42 is not a completely successful rejection of the unwanted wavelengths of light.

Where improved spectral filtration is required, it is possible to use a tilted dichroic filtered coating 42 by providing a slanted end face 44 of the light pipe 40 on which the coating 42 is deposited as shown in FIG. 6. Note that the tilting of the slanted end face 44 of the filter light pipe 40 causes refraction of the exiting light.

Figure 7:
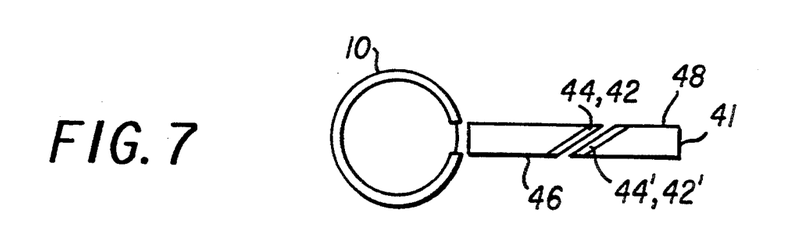
FIG. 7 is a schematic illustration of light pipe spectral filtration by a combination of a pair of colored material, light pipe sections with aligned slanted end faces and dichroic filter coatings on the aligned slanted end faces.

Alternatively, the light pipe 40 may be formed of two sections 46 and 48 each with a slanted end face 44, 44' having a dichroic filter coating 42 and/or 42'. As shown in FIG. 7, the two sections 46 and 48 are fitted so that the dichroic filter coatings 42, 42' and slanted end faces 44, 44' fit end to end in axial mating alignment.

The tilt angle of the dichroic filter coatings 42, 42' and slanted end faces 44, 44' causes light reflected by the filter coatings to be reflected in such a direction that it can escape from the sides of the light pipe section 46, and thus is completely rejected. The dielectric layer spacing of the dichroic filter coatings 42, 42' will be specified with the tilt angle taken into account, which is a well understood part of the design of dichroic filters. As an example, the Melles Griot part no. 03MHG009 dichroic filter is designed to be tilted at 45° and blocks wavelengths greater than 750 nm.

Figure 8:
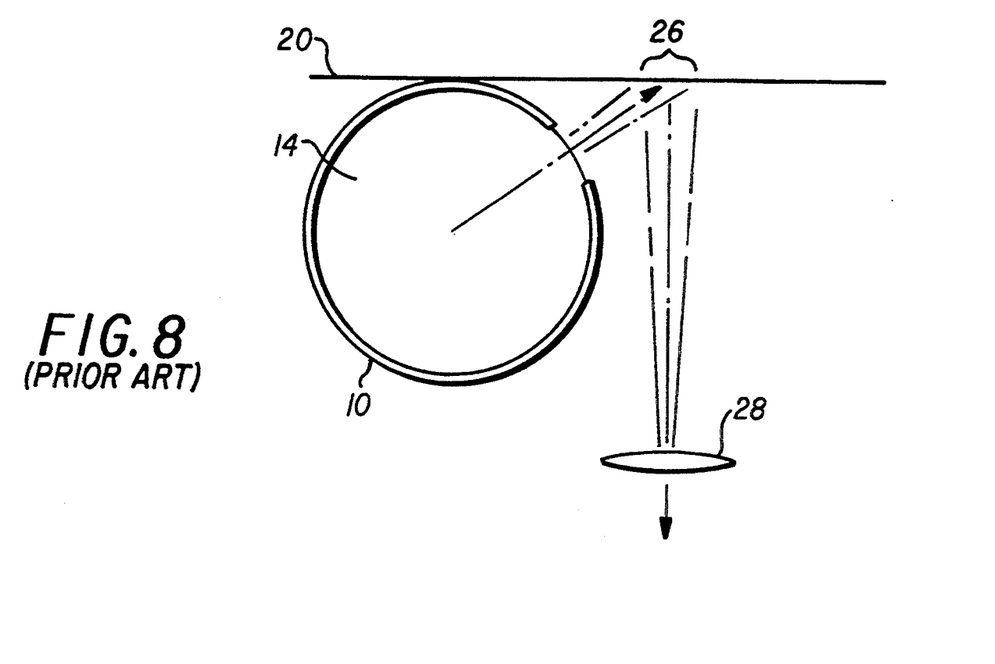
FIG. 8 is a schematic illustration of a typical configuration of a reflection scanner for scanning documents.
Figure 9:
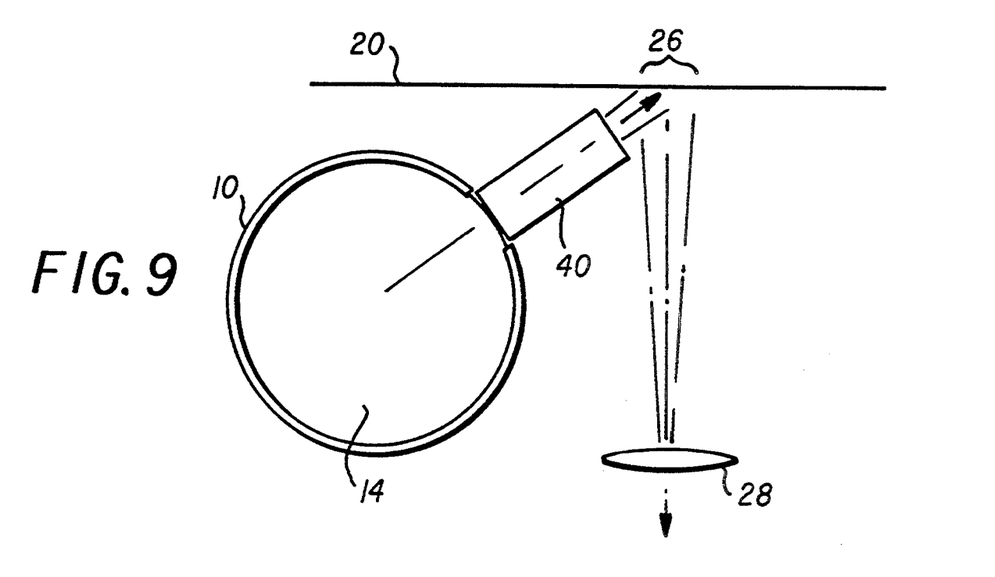
FIG. 9 is a schematic view of an improved reflection scanner configuration using the spectral filtering light pipe of the invention.

FIGS. 8 and 9 schematically illustrate in end views how the principles of the invention may be employed in a typical reflection scanner configuration. In reflection scanners of documents, an elongated fluorescent lamp 10 is typically used that is considerably larger in diameter than the lamp aperture 12 (a 30 degree aperture lamp is approximated in the illustration). This prevents the aperture 12 from closely approaching the line scan imaged region 26 which is being illuminated, both because the lamp 10 bumps into the document 20 (or a platen), and because the lamp 10 would obstruct the optical path from the imaged region 26 to the objective lens 28. The "imaged region" refers to that portion of the document 20 in the document scanning plane which is seen by the scanner sensor (linear CCD array or other photo sensor element or array), which is generally only a line scan of the document 20 as it is advanced past the aperture 12.

FIG. 9 shows how the spectral filter light pipe 40 permits the lamp 10 to be moved farther from the imaged region 26 which is being illuminated, while accomplishing spectral filtration and maintaining a narrower line illumination width. Because the light pipe 40 is narrower than the lamp 10, its free end can more closely approach the imaged region 26 in the document scanning plane. Because the light does not spread within the light pipe 40, this improved proximity results in higher brightness at the imaged region 26.

The spectrally selective light pipe 40 is also useful in conjunction with light integrators, particularly those having a light source or discrete lamp mounted within the integrating cavity, for use in either the transmission configuration scanner of FIG. 3 or the reflection configuration scanner of FIG. 9. In addition, the spectrally selective light pipe 40 may also be useful in light integrators of the type described in the above-referenced patents where light is introduced into the integrating cavity from the side wall or end(s) of the integrator housing. The light pipe 40 and its variations described above with reference to FIGS. 3–7 will suffice in such situations to provide spectral filtering of the scan line of light emitted from the aperture of the integrating cavity.

Such linear light sources employ a lamp(s) and lens and filter system (not shown) which directs a light beam into the integrating cavity through an input port(s). The lamp(s) can be, for example, a xenon lamp. One suitable xenon lamp is a Model No. LX-300f, manufactured by ILC Cermax Lamps. Other lamps can be used, e.g., a 24 volt DC tungsten-halogen lamp, type ELC, manufactured by General Electric Corporation. As described above, filtration for blocking infra-red wavelengths and emphasizing the blue light to scan negative film is necessary with these lamps.

Figure 10:
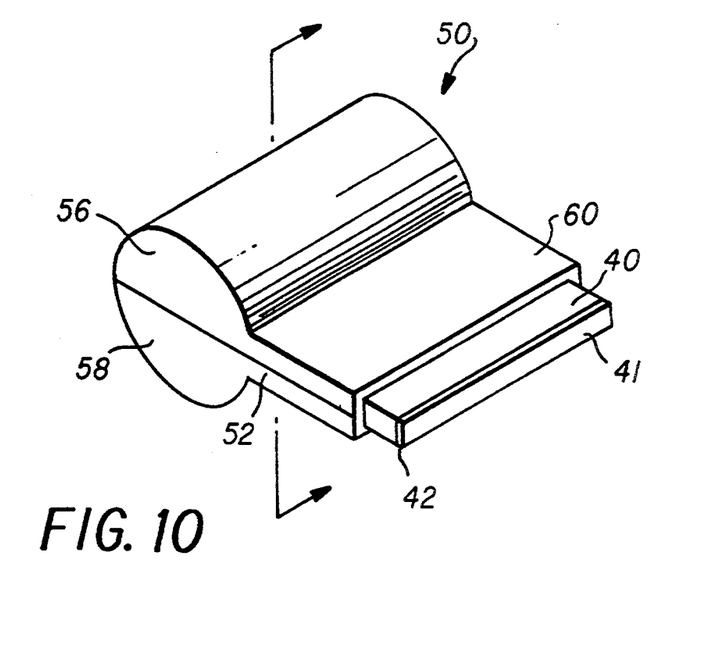
FIG. 10 is a perspective view of one form of a light integrator combined with a filtered light pipe.
Figure 11:
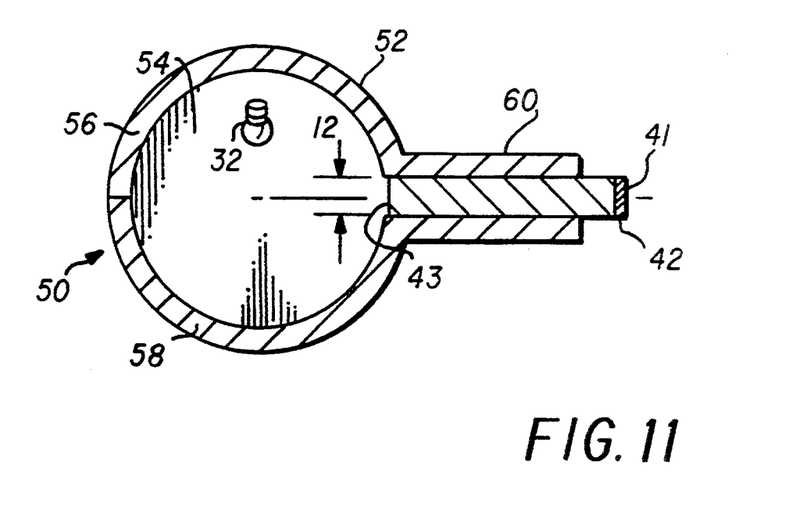
FIG. 11 is a side cross-section view of the light integrator combined with a filtered light pipe of FIG. 10.

FIGS. 10 and 11 illustrate the inclusion of the spectral filtering light pipe 40 into an extension 60 of the housing 52 of a light integrator 50 of the type described in the above-referenced '370 patent and '775 application, but having the lamp(s) 32 positioned within the integrating cavity 54. The housing 52 may be formed by attachment of two cast aluminum housing half sections 56 and 58 having painted interior surfaces within cavity 54 of the type identified in the above-referenced '383 patent., e.g. Spectraflect paint which is a highly diffussively reflective white paint obtainable from the Labsphere Corp., North Sutton, New Hampshire. The housing half sections 56, 58 may alternatively be machined from a plastic material, e.g. Spectralon plastic, also available from Labsphere, Corp. or other suitable plastic or metal of the type described in the above-identified '383 patent, where it is not necessary to paint the interior side wall and end surfaces with reflective white paint.

As shown in FIGS. 10 and 11, the cylindrical light integrating cavity 54 and the rectangular receptacle receiving the light pipe 40 are formed by the interior walls of the two half sections 56 and 58 when they are attached together. The cylindrical light integrating cavity 54 has an elongated cylindrical side wall coated with the white, reflective paint (or the white surface of the Spectralon plastic) extending between a pair of end walls.

The generally rectangular, spectral filtering light conducting bar or pipe 40 is fitted into the rectangular receptacle formed by the extension 60 of the half sections 56, 58. The light conducting bar or pipe 40 is tightly fitted into the rectangular receptacle of the half sections 56 and 58 and held there by compression in a manner described, for example, in the above-referenced '775 application, or in any other fashion.

An interior or light entrance end face 43 is oriented to the elongated, narrow slit or aperture 12 in and extending along the side wall length of the cavity 54. The lamp(s) 32 are positioned, in this illustration, at 90° to the axis of the light conducting pipe 40 to avoid direct axial transmission of its emitted light out of the cavity 54. Light emitted from the lamp(s) 32 in most directions is therefore reflected within the cavity 54 off the side or end walls at least once before it exits the aperture 12. The efficiency of the system is high in that all emitted light from the interior lamp(s) 32 is integrated within the cavity 54.

The light conducting bar or pipe 40 collects the light exiting aperture 12 and emits the line of diffuse light from its free end face 41 in the manner described above. The light pipe 40 is depicted as having a right angle face at its free end face 41 and a dichroic filter coating 42 thereon, but may take any of the forms described above with reference to FIGS. 3–7. The light conducting bar or pipe 40 may be constructed of any optically transparent, glass or plastic. The spectral filtering may be accomplished by the color selection of the optically transparent material and/or by the selection of the dichroic filter coatings as described above.

For the 35 mm film image frame scanning application, the integrating cavity 54 is about 33.5 mm long and about 22 mm in diameter. The light pipe 40 may have a width of about 30 mm sufficient to illuminate the length (in the line direction) of the film image frame. The thickness of the free end face 41 provides a scanning light line width of about 4 mm at the film scanning plane 24 (of FIG. 3).

Although FIGS. 10 and 11 show the lamp(s) 32 within the cavity 54, it will be understood that the invention may be practiced with the lamp(s) 32 located outside the cavity 54 in the manner described in the above-referenced patents. All or part of the spectral filtering may be accomplished according to the invention, whereas additional filtering may be accomplished in the light path between the lamp(s) and the entrance port(s).

It will also be understood that any of the light pipe configurations of FIGS. 3–7 may be employed in the embodiment of FIGS. 10 and 11 and held in place by the extension 60 of the housing 52. In addition, the housing 52 and extension 60 may be employed to embrace a fluorescent tube and position any of these light pipe embodiments in relation to the aperture 12 of the fluorescent tube for either transmission or reflection document scanning configurations.

In some applications it is desirable to coat one or both end faces 41, 43 and/or the slanted end faces 44, 44' of the light pipe 40 (and sections 46, 48) with anti-reflection coatings, to improve efficiency and to avoid spurious reflections. Typical spurious reflections include light reflected from the document to the light pipe free end face 41 or slanted end face 44, and back to the document. Where a spectrally selective dichroic filter is already needed at the end of the light pipe 40, the dielectric layer pattern can be designed to also serve as an anti-reflection coating In the FIG. 10 and 11 embodiment, the free end face 41 may also have a micro grit surface treatment effected by abrasion in order to mask the imaging of the mating seam of the two half sections 56 and 58 or any other surface defects in the cavity 54 onto the film scanning plane.

In all of the preferred embodiments described above, the light pipe 40 colored material selection may be chosen to achieve gross filtration. e.g. absorbing more red and green light than blue light to provide the blue cast line of light for illuminating negative film. The dichroic coatings may be selected to refine the spectral features, particularly for notch filtering and absorbing or deflecting infra-red wavelengths away.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1-11 fluorescent tube 10
the aperture 12
cavity 14
pattern 16
document 20
close position 22
distant position 24
imaged region 26
field lens 28
filter 30
lamp 32
CCD linear array 34
light bar or pipe 40
free end face 41
dichroic filter coatings 42, 42',
interior end face 43
slanted end face 44, 44'
light pipe sections 46, 48
light integrator 50
light integrator housing 52
integrating cavity 54
integrator housing half sections 56, 58
light integrator extension 60

What is claimed is:

1. A linear light source of the type employed in a document scanner for forming a line of uniform intensity, diffuse illumination at a document scanning plane comprising:
    an elongated light source having a longitudinally extending aperture therein for generating light at said aperture;
    a generally planar, light conducting pipe having a light entrance end face, a predetermined thickness, width and length and a light exiting end face for conducting light entering said light entrance end face through its length and emitting the light from said light exiting end face;
    spectral filter means associated with said light conducting pipe for spectrally filtering light emitted from said light exiting end face; and
    means for orienting said light conducting pipe with said light entrance end face positioned to receive light generated at said aperture and with said light exiting end face in proximity to a document scanning plane for conducting light exiting through said aperture along its length and for emitting the conducted light from said light exiting end face as a line of spectrally filtered diffuse illumination on a document in said document scanning plane.

2. The linear light source of claim 1 wherein said spectral filter means is embodied in colored material forming said light conducting pipe, said colored material attaining spectral selectivity by partially absorbing unwanted wavelengths of light.

3. The linear light source of claim 2 wherein said light conducting pipe is formed with at least one dichroic filter coating on one or more of said end faces thereof for attaining further spectral selectivity by reflecting unwanted wavelengths of light.

4. The linear light source of claim 3 wherein said light exiting end face is slanted at an angle to said length of said light conducting pipe to better reject wavelengths reflected back by the dichroic filter coating thereon.

5. The linear light source of claim 1 wherein said light conducting pipe is formed with at least one dichroic filter coating on one or more of said end faces thereof for attaining spectral selectivity by reflecting unwanted wavelengths of light.

6. The linear light source of claim 5 wherein said light exiting end face is slanted at an angle to said length of said light conducting pipe to better reject wavelengths reflected back by the dichroic filter coating thereon.

7. The linear light source of claim 1 wherein said light conducting pipe further comprises:
    a first light pipe section having said light entrance end face oriented to said light aperture and having a first slanted end face;
    a second light pipe section having said light exiting end face oriented to said light aperture and having a second slanted end face; and
    a first dichroic filter coating formed on one of said first and second slanted faces for attaining spectral selectivity by reflecting unwanted wavelengths of light; and
    wherein said orienting means further comprises means for supporting said first and second light pipe sections with said first and second slanted end faces in mating axial alignment.

8. The linear light source of claim 7 wherein said light conducting pipe further comprises:
    a second dichroic filter coating formed on the other of said first and second slanted faces for attaining spectral selectivity by reflecting unwanted wavelengths of light.

9. The linear light source of claim 1 wherein:
    said elongated light source comprises an elongated fluorescent tube emitting light in a spectral range of light wavelengths; and
    said spectral filter means is spectrally selective to attenuate transmission of selected light wavelengths.

10. The linear light source of claim 9 wherein said spectral filter means is embodied in colored material forming said light conducting pipe, said colored material attaining spectral selectivity by absorbing unwanted wavelengths of light.

11. The linear light source of claim 9 wherein said light conducting pipe is formed with at least one dichroic filter coating on one or more of said end faces thereof for attaining further spectral selectivity by reflecting unwanted wavelengths of light.

12. A linear light integrator of the type employed in a document scanner for forming a line of uniform intensity, diffuse illumination at a document scanning plane comprising:

an elongated light integrator having a light source, an elongated integrating cavity for integrating light emitted by said light source, and longitudinally extending aperture therein for generating light at said aperture;

a generally planar, light conducting pipe having a light entrance end face, a predetermined thickness, width and length and a light exiting end face for conducting light entering said light entrance end face through its length and emitting the light from said light exiting end face;

spectral filter means associated with said light conducting pipe for spectrally filtering light emitted from said light exiting end face; and means for orienting said light conducting pipe with said light entrance end face positioned to receive light generated at said aperture and with said light exiting end face in proximity with a document scanning plane for conducting light exiting through said aperture along its length and for emitting the conducted light from said light exiting end face as a line of spectrally filtered diffuse illumination on a document in said document scanning plane.

13. The linear light integrator of claim 12 wherein said spectral filter means is embodied in colored material forming said light conducting pipe, said colored material attaining spectral selectivity by partially absorbing unwanted wavelengths of light.

14. The linear light integrator of claim 13 wherein said light conducting pipe is formed with at least one dichroic filter coating on one or more of said end faces thereof for attaining further spectral selectivity by reflecting unwanted wavelengths of light.

15. The linear light integrator of claim 14 wherein said light exiting end face is slanted at an angle to said length of said light conducting pipe to better reject wavelengths reflected back by the dichroic filter coating thereon.

16. The linear light integrator of claim 12 wherein said light conducting pipe is formed with at least one dichroic filter coating on one or more of said end faces thereof for attaining spectral selectivity by reflecting unwanted wavelengths of light.

17. The linear light integrator of claim 16 wherein said light exiting end face is slanted at an angle to said length of said light conducting pipe to better reject wavelengths reflected back by the dichroic filter coating thereon.

18. The linear light integrator of claim 12 wherein said light conducting pipe further comprises:

a first light pipe section having said light entrance end face oriented to said light aperture and having a first slanted end face;

a second light pipe section having said light exiting end face oriented to said light aperture and having a second slanted end face; and a first dichroic filter coating formed on one of said first and second slanted faces for attaining spectral selectivity by reflecting unwanted wavelengths of light; and wherein said orienting means further comprises means for supporting said first and second light pipe sections with said first and second slanted end faces in mating axial alignment.

19. The linear light integrator of claim 18 wherein said light conducting pipe further comprises:

a second dichroic filter coating formed on the other of said first and second slanted faces for attaining spectral selectivity by reflecting unwanted wavelengths of light.

20. The linear light integrator of claim 19 wherein said first and second light pipe sections are formed of colored material, said colored material attaining spectral selectivity by absorbing unwanted wavelengths of light.

21. The linear light integrator of claim 18 wherein said first and second light pipe sections are formed of colored material, said colored material attaining spectral selectivity by absorbing unwanted wavelengths of light.

* * * * *